US012668173B2

(12) United States Patent
Sung

(10) Patent No.: US 12,668,173 B2
(45) Date of Patent: *Jun. 30, 2026

(54) FRONT HEADLAMP CONTROL SYSTEM AND CONTROL METHOD THEREOF

(71) Applicant: HYUNDAI MOBIS CO., LTD., Seoul (KR)

(72) Inventor: Jun Young Sung, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 83 days.

This patent is subject to a terminal disclaimer.

(21) Appl. No.: 18/805,906

(22) Filed: Aug. 15, 2024

(65) Prior Publication Data

US 2024/0399951 A1 Dec. 5, 2024

Related U.S. Application Data

(63) Continuation of application No. 18/145,537, filed on Dec. 22, 2022, now Pat. No. 12,090,914.

(30) Foreign Application Priority Data

Feb. 11, 2022 (KR) ........................ 10-2022-0017879

(51) Int. Cl.
*B60Q 1/12* (2006.01)
*B60Q 1/08* (2006.01)
(Continued)

(52) U.S. Cl.
CPC .............. *B60Q 1/12* (2013.01); *B60Q 1/085* (2013.01); *B60Q 1/143* (2013.01); *H05B 47/105* (2020.01);
(Continued)

(58) Field of Classification Search
CPC .......... B60Q 5/005; B60Q 1/14; B60Q 3/258; B60Q 3/59; B60Q 3/225; B60Q 1/0023;
(Continued)

(56) References Cited

U.S. PATENT DOCUMENTS 6,010,237 A 1/2000 Gotou
6,049,749 A 4/2000 Kobayashi
(Continued)

FOREIGN PATENT DOCUMENTS

EP 2484557 A2 8/2012
EP 2495129 B1 6/2017
(Continued)

OTHER PUBLICATIONS

European Search Report issued on Jun. 16, 2023 in corresponding European Patent Application No. 22215299.3.
Office action issued on Apr. 4, 2024 for corresponding EP Patent Application No. 22215299.3.

*Primary Examiner* — Wei (Victor) Y Chan
(74) *Attorney, Agent, or Firm* — NovoTechIP International PLLC

(57) ABSTRACT

The present invention relates to a headlamp control system. The front headlamp control system and a control method thereof according to the present invention are highly applicable to existing vehicles and are capable of efficiently controlling light of a front headlamp by adjusting a light quantity of the front headlamp based on a combination of navigation information and camera information in addition to a steering angle of a steering wheel, and are capable of increasing visibility of an area in front of a driver by calculating a light-off section in a case where there is a preceding vehicle and increasing, in a case where a changed position of a high luminance region overlaps the light-off (Continued)

section, a range of a central luminance region in a horizontal direction or a vertical direction to maintain the high luminance region.

14 Claims, 10 Drawing Sheets

(51) Int. Cl.
    *B60Q 1/14*         (2006.01)
    *H05B 47/105*     (2020.01)

(52) U.S. Cl.
    CPC .... *B60Q 2200/30* (2013.01); *B60Q 2300/054* (2013.01); *B60Q 2300/122* (2013.01); *B60Q 2300/322* (2013.01)

(58) Field of Classification Search
    CPC ...... B60Q 1/302; B60Q 2300/45; B60Q 3/20; B60Q 1/085; B60Q 1/525
    See application file for complete search history.

(56) References Cited

U.S. PATENT DOCUMENTS

| | | | |
|---|---|---|---|
| 2002/0039295 A1 | 4/2002 | Kobayashi et al. | |
| 2003/0067780 A1* | 4/2003 | Fukawa | B60Q 1/18 |
| | | | 362/466 |
| 2007/0253597 A1* | 11/2007 | Utida | G06V 20/584 |
| | | | 382/104 |
| 2008/0106886 A1 | 5/2008 | Sugimoto et al. | |
| 2011/0025209 A1* | 2/2011 | Nakanishi | B60Q 1/12 |
| | | | 315/82 |
| 2016/0332568 A1* | 11/2016 | Kim | B60Q 1/544 |
| 2016/0368414 A1* | 12/2016 | Son | F21S 41/663 |
| 2017/0232882 A1 | 8/2017 | Mochizuki | |
| 2019/0186948 A1* | 6/2019 | Hayee | B60Q 9/00 |
| 2020/0398738 A1 | 12/2020 | Lee et al. | |

FOREIGN PATENT DOCUMENTS

| | | |
|---|---|---|
| EP | 3246204 A1 | 11/2017 |
| EP | 3402694 B1 | 3/2021 |
| KR | 20210111232 A | 9/2021 |

* cited by examiner

FRONT HEADLAMP CONTROL SYSTEM AND CONTROL METHOD THEREOF

CROSS-REFERENCE TO RELATED APPLICATIONS

This application is a continuation of U.S. patent application Ser. No. 18/145,537 titled "FRONT HEADLAMP CONTROL SYSTEM AND CONTROL METHOD THEREOF," filed on Dec. 22, 2022, which claims priority under 35 U.S.C. § 119 to Korean Patent Application No. 10-2022-0017879, filed on Feb. 11, 2022, in the Korean Intellectual Property Office, the disclosure of which is incorporated herein by reference in its entirety.

TECHNICAL FIELD

The following disclosure relates to a headlamp control system, and more particularly, to a front headlamp control system for controlling a light source mounted on a front side of a vehicle, and a control method thereof.

BACKGROUND

A vehicle according to the related art is equipped with a night driving safety system that enhances the visibility of the vehicle while significantly reducing damage from glare to other people, such as an intelligent head light emitting element, an adaptive driving beam (ADB) system, or a high beam assistance (HBA) system. The development of such a high beam system also has a problem in that appearances of wild animals on roads and roadkill are rapidly increasing while traveling due to excessive glare for wild animals.

More specifically, in a case of the current intelligent head light emitting element, especially the ADB system, the largest quantity of light at the center may be lost in a situation of following a preceding vehicle. As a result, the total light quantity may be decreased, and it may be difficult for a driver to recognize a wild animal when the wild animal appears on a shoulder of a curved road or the like. Accordingly, the need for a technology to eliminate potential safety threats by controlling the head light emitting element or the high beam based on vehicle driving information and environmental information such as a road curvature to provide optimal visibility to a driver has emerged.

Therefore, dynamic bending light (DBL), which is a technology applied to a low beam among the related arts, assists in improving the visibility on a curved road by rotating a beam pattern by means of connection to a steering. However, the DBL is also an incomplete technology that does not have enough time to recognize and take measures for wild animals in advance because the pattern rotates when a driver actually enters a curved road and controls the steering.

Further, in a case of the high beam, there is no corresponding solution because it is difficult to apply a general control mechanism due to the trend of removing an actuator. In particular, in a case of the ADB system, there is a problem that, when following a preceding vehicle, the efficiency of the high beam significantly deteriorates as a central portion that corresponds to the largest quantity of light is frequently not irradiated with light.

SUMMARY

An embodiment of the present invention is directed to providing a front headlamp control system that is highly applicable to existing vehicles and is capable of efficiently controlling light of a front headlamp by adjusting a light quantity of the front headlamp based on a combination of navigation information and camera information in addition to a steering angle of a steering wheel, and a control method thereof.

Another embodiment of the present invention is directed to providing a front headlamp control system that is capable of increasing visibility of an area in front of a driver by calculating a light-off section in a case where there is a preceding vehicle and increasing, in a case where a changed position of a high luminance region overlaps the light-off section, a range of a central luminance region in a horizontal direction or a vertical direction to maintain the high luminance region, and a control method thereof.

Another embodiment of the present invention is directed to providing a front headlamp control system that is capable of being easily implemented without an increase in the number of parts and an increase in cost by being controlled by means of interaction with a sensor already mounted in a vehicle, and a control method thereof.

In one general aspect, a front headlamp control system includes: a light source unit provided on a front side of a mobility device or mobile body and including two or more light emitting elements; and a control unit controlling the light source unit in such a way that a relative position or range of a high luminance region is changed within a predetermined light irradiation region based on received environmental information, in which the environmental information includes steering angle information of the mobility device, and further includes at least one of road surface information of a road surface on which the mobility device is located, or road navigation information The control unit may control the light source unit in such a way that an intensity of light from a light emitting element that irradiates the high luminance region with the light among the two or more light emitting elements is higher than intensities of light from other light emitting elements.

The light source unit may further include a direction adjustment actuator that adjusts a light irradiation direction of the light emitting element, and the control unit may control the direction adjustment actuator in such a way that a luminance of the high luminance region is higher than a luminance of a region other than the high luminance region.

The control unit may calculate an expected movement route from the steering angle information of the mobility device, calculate a curvature of a road based on at least one of the road surface information image information or the road navigation information, and change, in a case where a curvature of the expected movement route is greater than the curvature of the road, a position of the high luminance region in a steering direction of the mobility device in proportion to an amount of real-time steering angle change.

The control unit may calculate an expected movement route from the steering angle information of the mobility device, calculate a curvature of a road based on at least one of the road surface information or the road navigation information, and further adjust, in a case where a curvature of the expected movement route is equal to or less than the curvature of the road, a position of the high luminance region in proportion to a real-time curvature of the road.

The control unit may sequentially set first to (n)th reference values for the curvature of the road, compare the first to (n)th reference values with the curvature of the road, and adjust the position of the high luminance region in stages, n being a natural number.

The environmental information may include information regarding an object in front of the mobility device, and in a case where one or more objects exist in front of the mobility device, the control unit may designate, as a low luminance region, a region where the object is positioned in the light irradiation region of the light source unit, and control the light source unit in such a way that a luminance of the low luminance region is equal to or lower than a predetermined value.

In a case where the low luminance region and the high luminance region at least partially overlap each other, the control unit may control to irradiate a portion where the low luminance region and the high luminance region overlap each other with a quantity of light corresponding to the low luminance region, and expand or change the relative position or range of the high luminance region to an outside of the low luminance region.

In a case where the low luminance region and the high luminance region at least partially overlap each other, the control unit may control to irradiate the portion where the low luminance region and the high luminance region overlap each other with a quantity of light corresponding to the low luminance region, and expand or change the relative position or range of the high luminance region to the outside of the low luminance region in at least one of a vertical direction or a horizontal direction with respect to the low luminance region.

The control unit may control the light source unit in such a way that the range of the high luminance region adjusted to be positioned outside the low luminance region has the same size as that of the range of the high luminance range before the adjustment.

In a case where the light source unit is controlled only in a horizontal direction and emits light in such a way that an entire range corresponding to a width of an obstacle in a vertical direction becomes the low luminance region, the control unit may designate the high luminance region in such a way that the high luminance region is moved in the horizontal direction with respect to the low luminance region to position the high luminance region outside the low luminance region.

In a case where the light source unit is controlled in a vertical direction and a horizontal direction and emits light in such a way that only a range corresponding to a position of an obstacle becomes the low luminance region, the control unit may designate the high luminance region in such a way that the high luminance region is moved in the horizontal direction and the vertical direction with respect to the low luminance region outside the low luminance region to position the high luminance region outside the low luminance region.

In a case where the low luminance region and the high luminance region are adjacent to each other, the control unit may adjust quantities of light of adjacent portions to an intermediate value between a quantity of light in the low luminance region and a quantity of light in the high luminance region.

In another general aspect, a control method of a front headlamp control system includes: a step (a) of receiving, by a control unit, environmental information including steering angle information of a mobility device and further including at least one of road surface information of a road surface on which the mobility device is located or road navigation information; a step (b) of calculating, by the control unit, a curvature of a road from the received environmental information; and a step (c) of setting or adjusting, by the control unit, a high luminance region based on the environmental information.

The step (c) may include a step (c1) of adjusting, by the control unit, a position of the high luminance region in such a way that the high luminance region is moved by a distance proportional to an amount of real-time steering angle change in a steering direction of the mobility device, in a case where a curvature of an expected route of the mobility device is greater than the curvature of the road.

In the step (c), in a case where a curvature of an expected route of the mobility device is equal to or less than the curvature of the road, the control unit may set first to (n)th reference values for the curvature of the road, and the step (c) may include: a step (c2) of maintaining a position of the high luminance region in a case where the curvature of the road is less than the first reference value, n being a natural number; and a step (c3) of adjusting, by the control unit, the position of the high luminance region in such a way that the position of the high luminance region is moved by a predetermined distance corresponding to an $(i-1)$th reference value in a case where the curvature of the road is less than an $(i-1)$th reference value, i being a positive integer, and $1 < i \leq n$.

The environmental information may include information regarding an object in front of the mobility device, and the control method may further include: after the step (c), in a case where one or more objects exist in front of the mobility device, a step (d) of calculating, by the control unit, a region where the object is positioned in a light irradiation region of a light source unit as a low luminance region; and a step (e) of setting, by the control unit, a final light pattern by adjusting the low luminance region and the high luminance region.

The step (d) may include: a step (d1) of temporarily storing a position of the high luminance region adjusted in the step (c); a step (d2) of receiving and storing position information of the object; and a step (d3) of comparing the position information of the object with the light irradiation region of the light source unit to determine the low luminance region, and in a case where the high luminance region and the low luminance region at least partially overlap each other, the step (d) may further include a step (d4) of expanding the high luminance region in at least one of a vertical direction or a horizontal direction with respect to the low luminance region.

In the step (d4), the control unit may control the light source unit in such a way that a range of the high luminance region adjusted to be positioned outside the low luminance region has the same size as that of the range of the high luminance range before the adjustment.

In the step (d4), in a case where the light source unit is controlled only in the horizontal direction and emits light in such a way that an entire range corresponding to a width of an obstacle in the vertical direction becomes the low luminance region, the control unit may designate the high luminance region in such a way that the high luminance region is moved in the horizontal direction with respect to the low luminance region to position the high luminance region outside the low luminance region.

In the step (d4), in a case where the light source unit is controlled in the vertical direction and the horizontal direction and emits light in such a way that only a range corresponding to a position of an obstacle becomes the low luminance region, the control unit may designate the high luminance region in such a way that the high luminance region is moved in the horizontal direction and the vertical direction with respect to the low luminance region outside the low luminance region to position the high luminance region outside the low luminance region.

In a case where the low luminance region and the high luminance region are adjacent to each other, the control unit may adjust quantities of light of adjacent portions to an intermediate value between a quantity of light in the low luminance region and a quantity of light in the high luminance region.

DETAILED DESCRIPTION

Hereinafter, the technical spirit of the present invention will be described in more detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Figure 1:
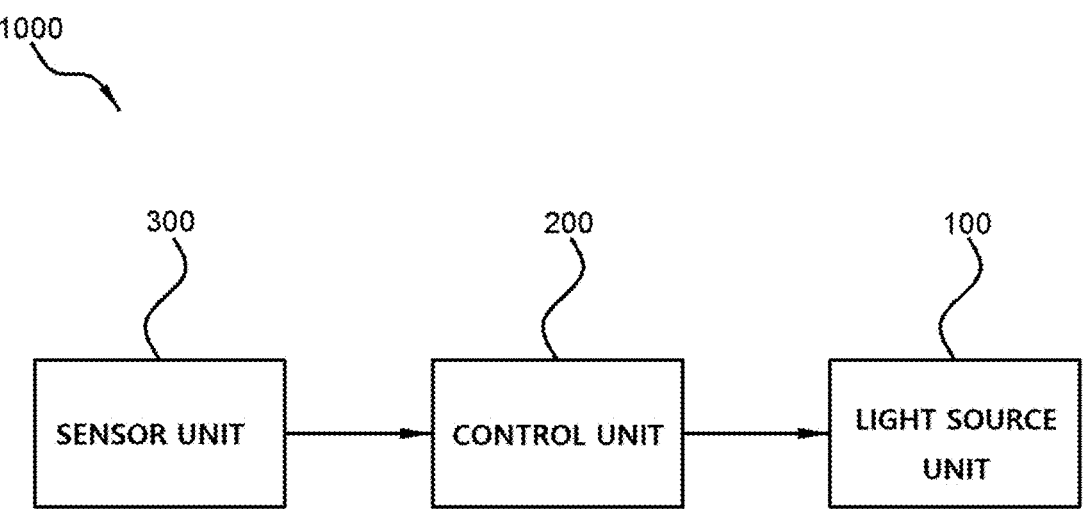
FIG. 1 is a block diagram illustrating a basic configuration of a front headlamp control system according to the present invention.

Hereinafter, a basic configuration of a front headlamp control system 1000 according to the present invention will be described with reference to FIG. 1.

The front headlamp control system 1000 according to the present invention may include a light source unit 100 provided on a front side of a mobility device V and including two or more light emitting elements, and a control unit 200 controlling the light source unit 100 in such a way as to change a relative position of a high luminance region H within a predetermined light irradiation region based on received environmental information. It is preferable that the environmental information includes steering angle information of the mobility device V and includes at least one of road surface information of a road surface on which the mobility device V is located, or road R navigation information.

Here, the light source unit 100 may be an intelligent headlamp, an adaptive driving beam (ADB) system, or a high beam assistance (HBA) system, and the control unit 200 may be an electronic control unit (ECU) of the mobility device V. The environmental information received by the control unit 200 is preferably received from a sensor unit 300 mounted on the mobility device V, and the sensor unit 300 preferably includes a navigation system, a camera, and a steering sensor.

Here, the high luminance region H is a central luminance region for light from the light source unit 100, and may be a region having a relatively high luminance in the light irradiation region of the light source unit 100. At this time, it is preferable that the control unit 200 controls the light source unit 100 with the ultimate goal of positioning the high luminance region H at the center of a visual field of a driver. At this time, the control unit 200 does not increase or decrease a light irradiation range of the light source unit 100, but controls a light irradiation angle of the light source unit 100 using a swivel actuator or controls an intensity of each light source included in the light source unit 100 by pixelating each light source for each position to control the position and range of the high-intensity region H. Accordingly, it is possible to prevent the high luminance region H from deviating from the center of the visual field of the driver and being eccentric when the mobility device V turns a corner or the like, and it is possible to efficiently secure the visual field of the driver by changing and securing the position of the high luminance region H in a case where a region switched to the low luminance region L due to the presence of an external obstacle (or turned off) overlaps the high luminance region H. In addition, excessive energy consumption can be prevented by maintaining the total quantity of light within a predetermined small range without increasing or decreasing the light irradiation range as a whole.

Hereinafter, the adjustment of the high luminance region H by the control unit 200 will be described in more detail with reference to FIGS. 2 and 3.

Figure 2:
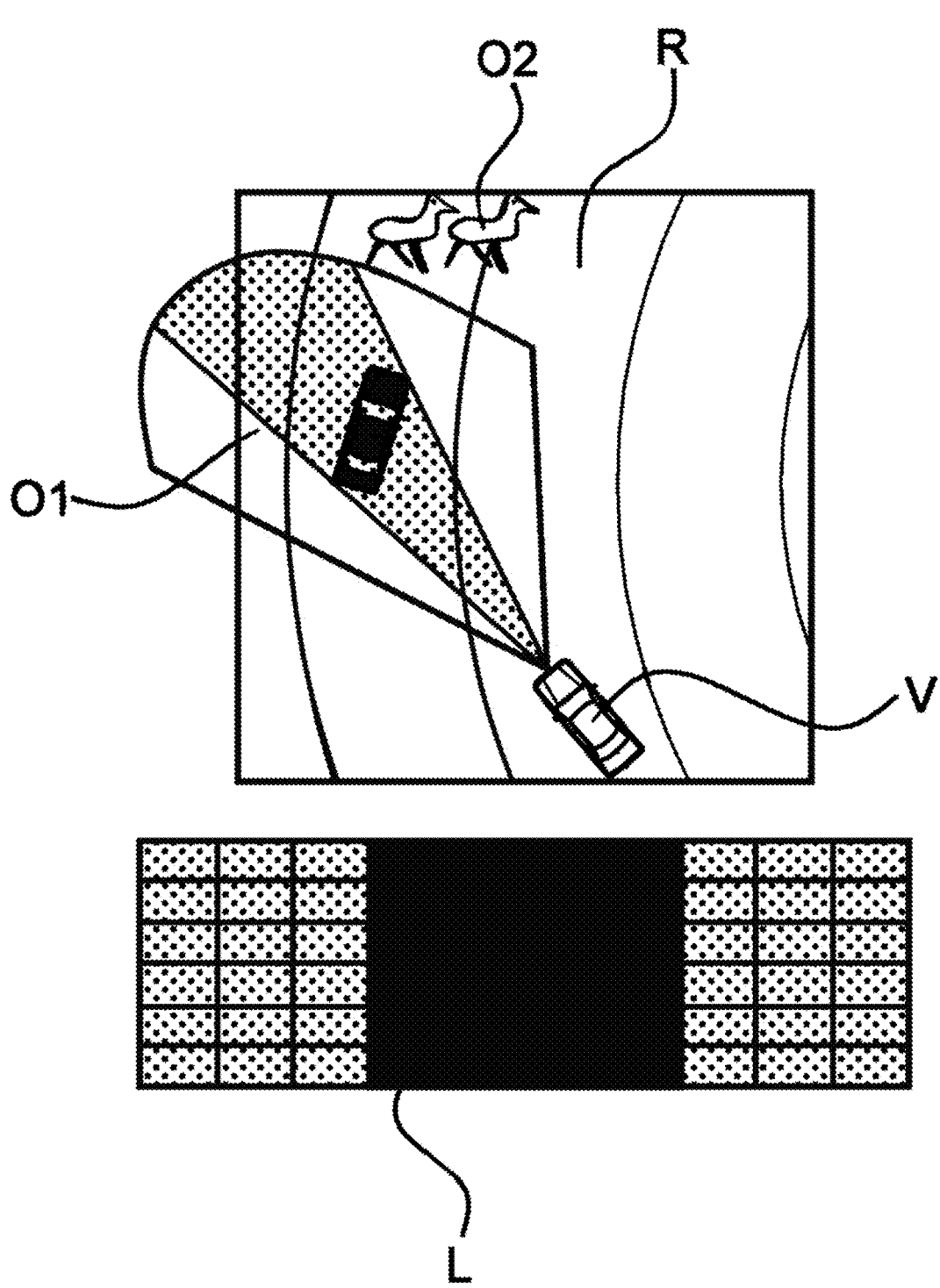
FIG. 2 is a schematic diagram illustrating a visual field blocking phenomenon when an obstacle is positioned in a front area.
Figure 3:
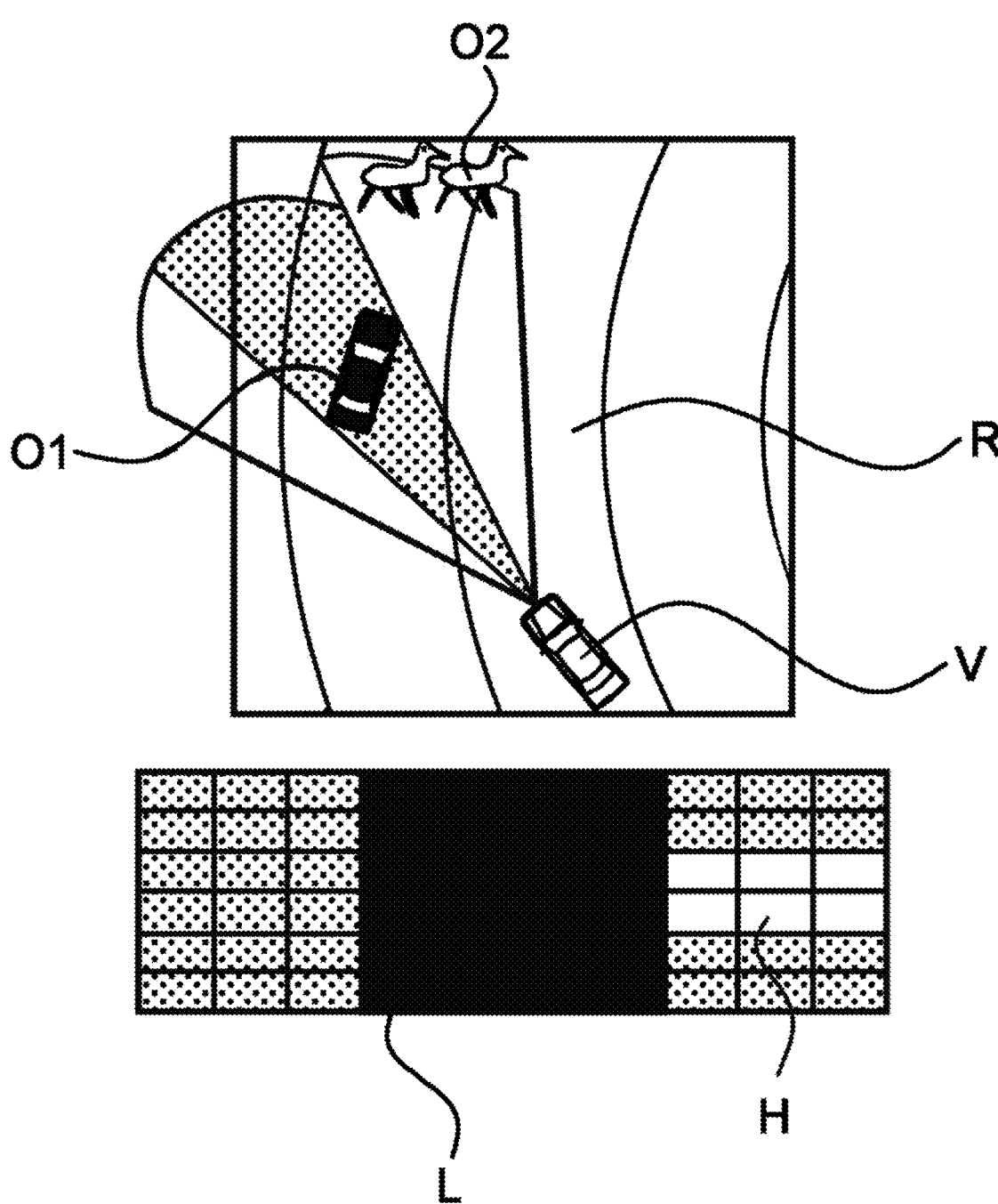
FIG. 3 is a schematic diagram illustrating adjustment of a high luminance region by a control unit according to the present invention when an obstacle is positioned in a front area.

As illustrated in FIG. 2, in a case where a road R on which the mobility device V travels is a curved road having a curvature equal to or greater than a predetermined curvature, when the low luminance region L is generated due to the presence of an existing first front object O1, and a second front object O2 additionally appears on the road, a visual field blocking phenomenon may occur as the low luminance region L and the high luminance region H overlap each other. Accordingly, it may be difficult for the driver to recognize the appearance of the second front object O2. Therefore, it is preferable that the control unit 200 maintains a portion where the low luminance region L and the high luminance region overlap each other as the low luminance region L to prevent the existing first front object O1 from being irradiated with an excessive quantity of light, and changes the position and range of the high luminance region H in such a way as to be adjacent to the low luminance region L as illustrated in FIG. 3 to secure the high luminance region H, thereby securing the visual field of the driver.

Hereinafter, an algorithm for adjusting the high luminance region H by the control unit 200 will be described in more detail with reference to FIGS. 4 to 7.

It is preferable that the control unit 200 calculates, before controlling the low luminance region L and the high luminance region H, an expected movement route from the steering angle information of the mobility device V, calculates the curvature of the road R based on at least one of the road surface information of the road surface on which the mobility device V is located or the road R navigation information, and changes the position of the high luminance region H in proportion to the amount of change in real-time steering angle in a steering direction of the mobility device V in a case where a curvature of the expected movement route is greater than the curvature of the road R.

In addition, it is preferable that the control unit 200 calculates an expected movement route from the steering angle information of the mobility device V, calculates the curvature of the road R based on at least one of the road surface information of the road surface on which the mobility device V is located or the road R navigation information, and more sharply adjusts the position of the high luminance region H as the real-time curvature of the road R is increased in the steering direction of the mobility device V in a case where a curvature of the expected movement route is equal to or less than the curvature of the road R.

In addition, it is preferable that the control unit 200 sequentially sets first to (n)th reference values for the curvature of the road R (n is a positive integer greater than 1), and compares the calculated curvature of the road R with predetermined first to (n)th reference values to set the amount of change of the relative position of the high luminance region H in stages.

In this case, in a case of a first example of the light source unit 100, the light source unit 100 may be formed by integrating a plurality of light emitting elements. The control unit 200 may control each light emitting element independently by dividing and pixelating the light irradiation region according to the position of the light emitting element. It is preferable that the control unit 200 designates the high luminance region H as described above and controls the light source unit 100 in such a way that an intensity of light from a light emitting element that irradiates the high luminance region H with the light among the plurality of light emitting elements is higher than intensities of light from other light emitting elements.

In addition, in a case of a second example of the light source unit 100, the light source unit 100 may further include a direction adjustment actuator for adjusting a light irradiation direction of the light emitting element. At this time, it is preferable that the direction adjustment actuator is a swivel actuator. It is preferable that the control unit 200 controls the direction adjustment actuator in such a way that a luminance of the high luminance region H is higher than a luminance of a region other than the high luminance region H.

At this time, the control unit 200 may designate the position of the high luminance region H as described above, calculate a distance of the high luminance region H from the current state, and calculate an angle to which the light source unit 100 is to be adjusted by the direction adjustment actuator. In this case, a direction adjustment speed for the light source unit 100 may be controlled by applying a filter time constant of the light source unit 100.

Further, the environmental information received by the control unit 200 may include information regarding an object in front of the mobility device V, the information including size and speed information of an obstacle positioned in front of the mobility device V, and in a case where one or more objects are detected in front of the mobility device V, the control unit 200 may designate a region where the object is positioned in the light irradiation region of the light source unit 100 as the low luminance region L and lower the luminance.

Accordingly, in a case where the first example of the light source unit 100 is applied, it is preferable to decrease the quantity of light from a light emitting element that irradiates the low luminance region L with the light or turn off the light emitting element, and in a case where the second example of the light source unit 100 is applied, it is preferable to mask the low luminance region L to irradiate the low luminance region L with a predetermined quantity or less of light.

Figure 4:
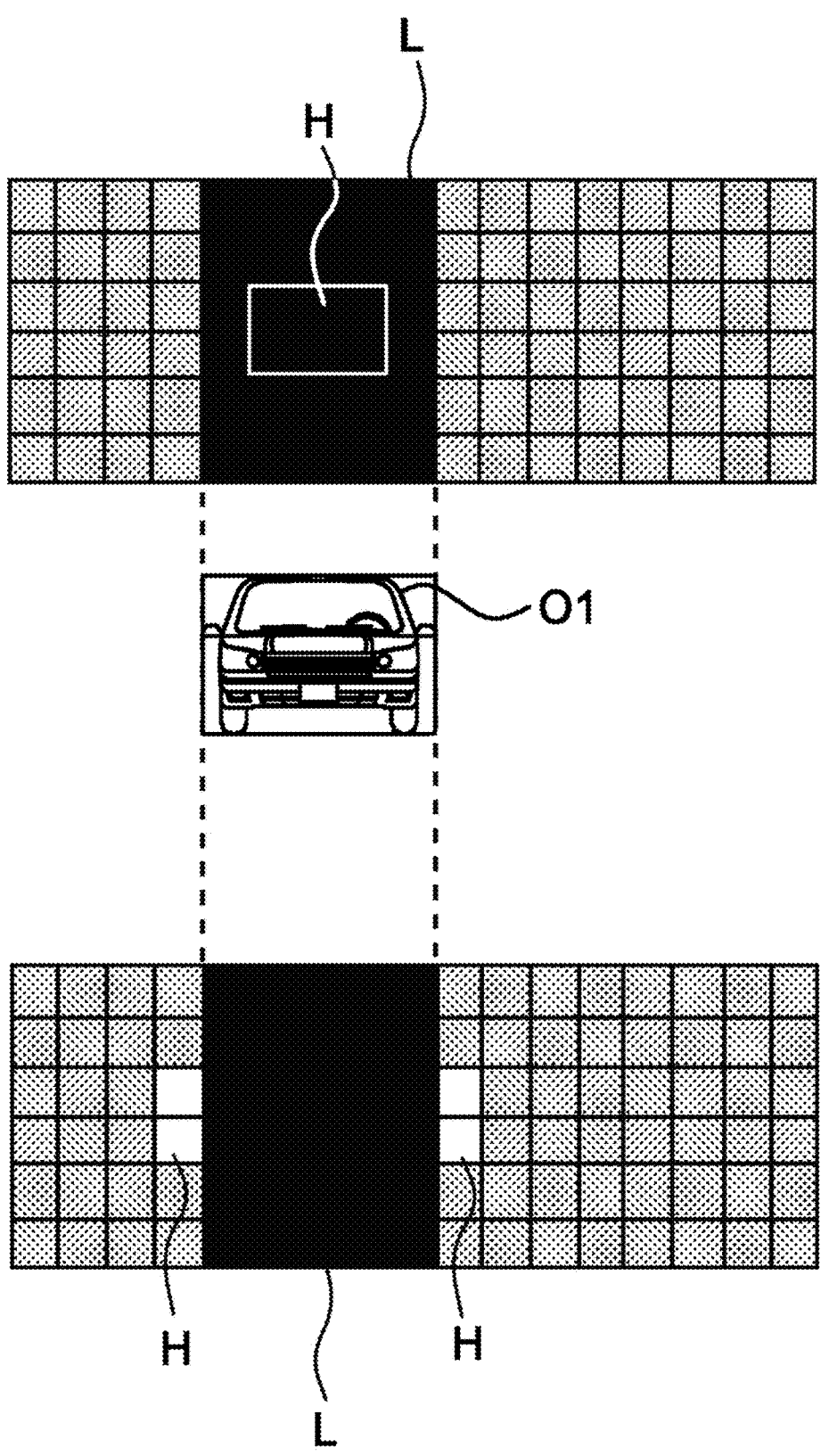
FIG. 4 is a schematic diagram illustrating a first example of a method of correcting a low luminance region and a high luminance region by the control unit according to the present invention, in a case of a first example of a light source unit.

At this time, in a case where the low luminance region L and the high luminance region H at least partially overlap each other, it is preferable that the control unit 200 change the relative position of the high luminance region H in the light irradiation region in such a way as to expand the high luminance region H to the surroundings of the low luminance region L as much as the size of the overlapping portion of the high luminance region H. As illustrated in FIGS. 3 and 4, in a case where the first example of the light source unit 100 is applied, and the relative position of the high luminance region H designated according to the steering angle of the steering wheel of the mobility device V and the curvature of the road R at least partially overlaps with the low luminance region L, it is preferable that the control unit 200 expands the range of the high luminance region H to the surroundings of the low luminance region L to secure the high luminance region H. At this time, it is preferable to irradiate a portion where the low luminance region L and the high luminance region H overlap each other with a designated quantity of light corresponding to the low luminance region L to prevent an external object from being irradiated with light having a high intensity.

Figure 5:
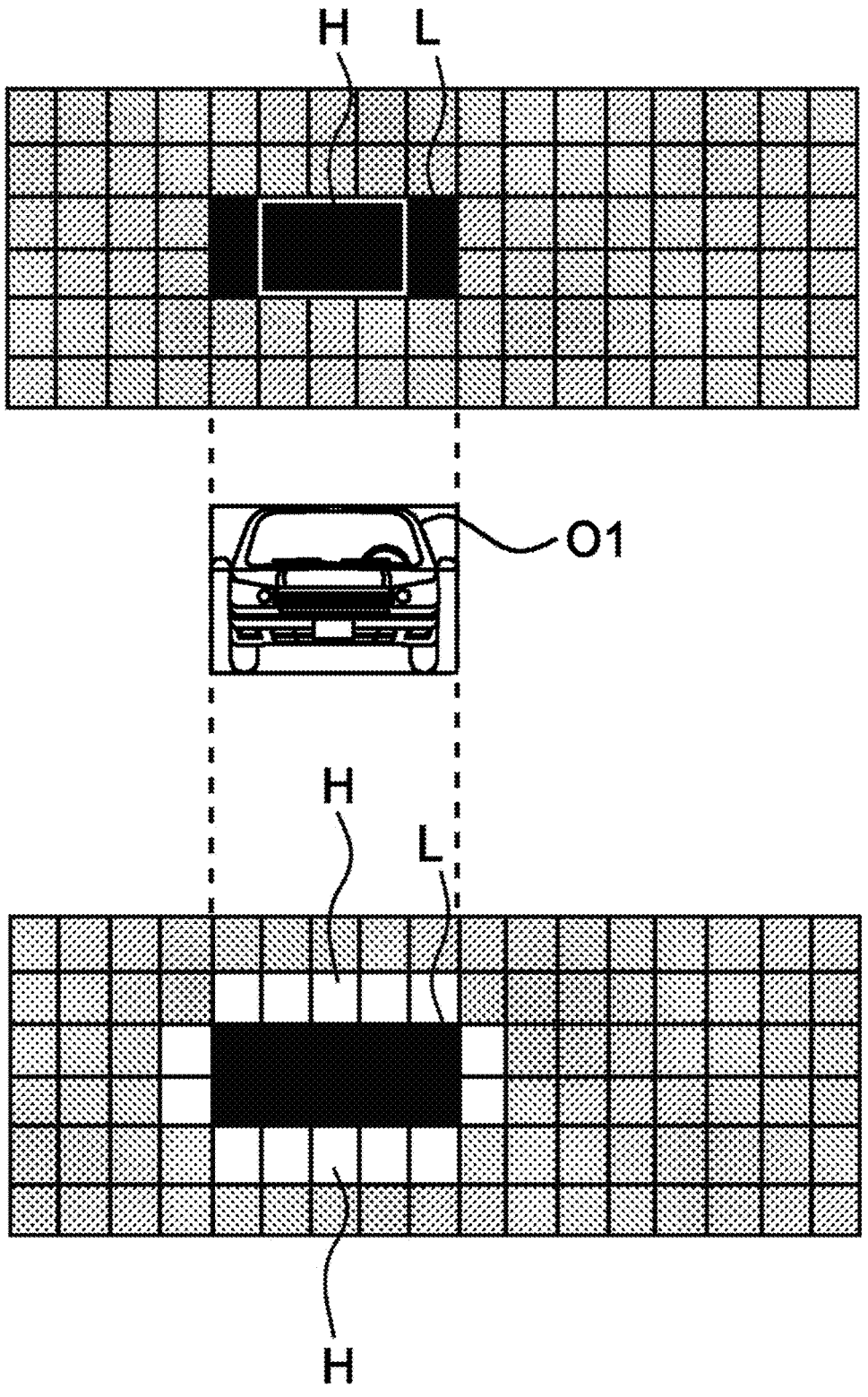
FIG. 5 is a schematic diagram illustrating a second example of the method of correcting the low luminance region and the high luminance region by the control unit according to the present invention, in a case of the first example of the light source unit.

More specifically, as illustrated in FIG. 4, in a case where the light source unit 100 is a type of light source unit that emits light in such a way that an entire range corresponding to a width of an obstacle in a vertical direction becomes the low luminance region L, it is preferable that the control unit 200 designates the high luminance region H in such a way as to expand the range of the high luminance region H in a horizontal direction with respect to the low luminance region L in a dispersed manner. Alternatively, as illustrated in FIG. 5, in a case where the light source unit 100 is a type of light source unit that also has a vertical control function and thus does not emit only light corresponding to a position of an obstacle, it is preferable that the control unit 200 designates the high luminance region H in such a way as to expand the range of the high luminance region H in not only the horizontal direction but also the vertical direction with respect to the low luminance region L in a dispersed manner. In this case, it is preferable that the range of the high luminance region H adjusted to be positioned outside the low luminance region L has the same size as that of the range of the existing high luminance region H.

Figure 6:
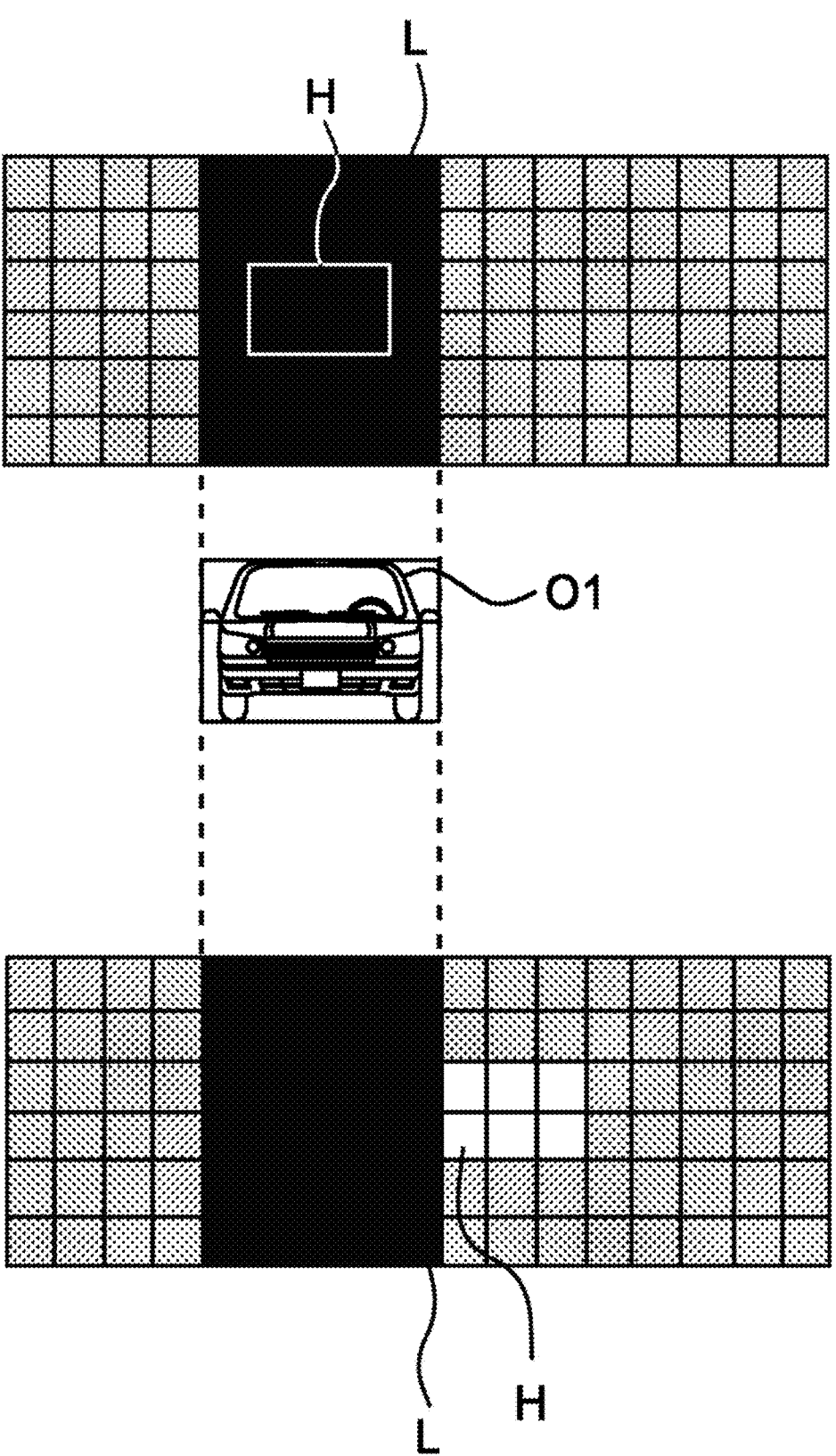
FIG. 6 is a schematic diagram illustrating the first example of the method of correcting the low luminance region and the high luminance region by the control unit according to the present invention, in a case of a second example of the light source unit.
Figure 7:
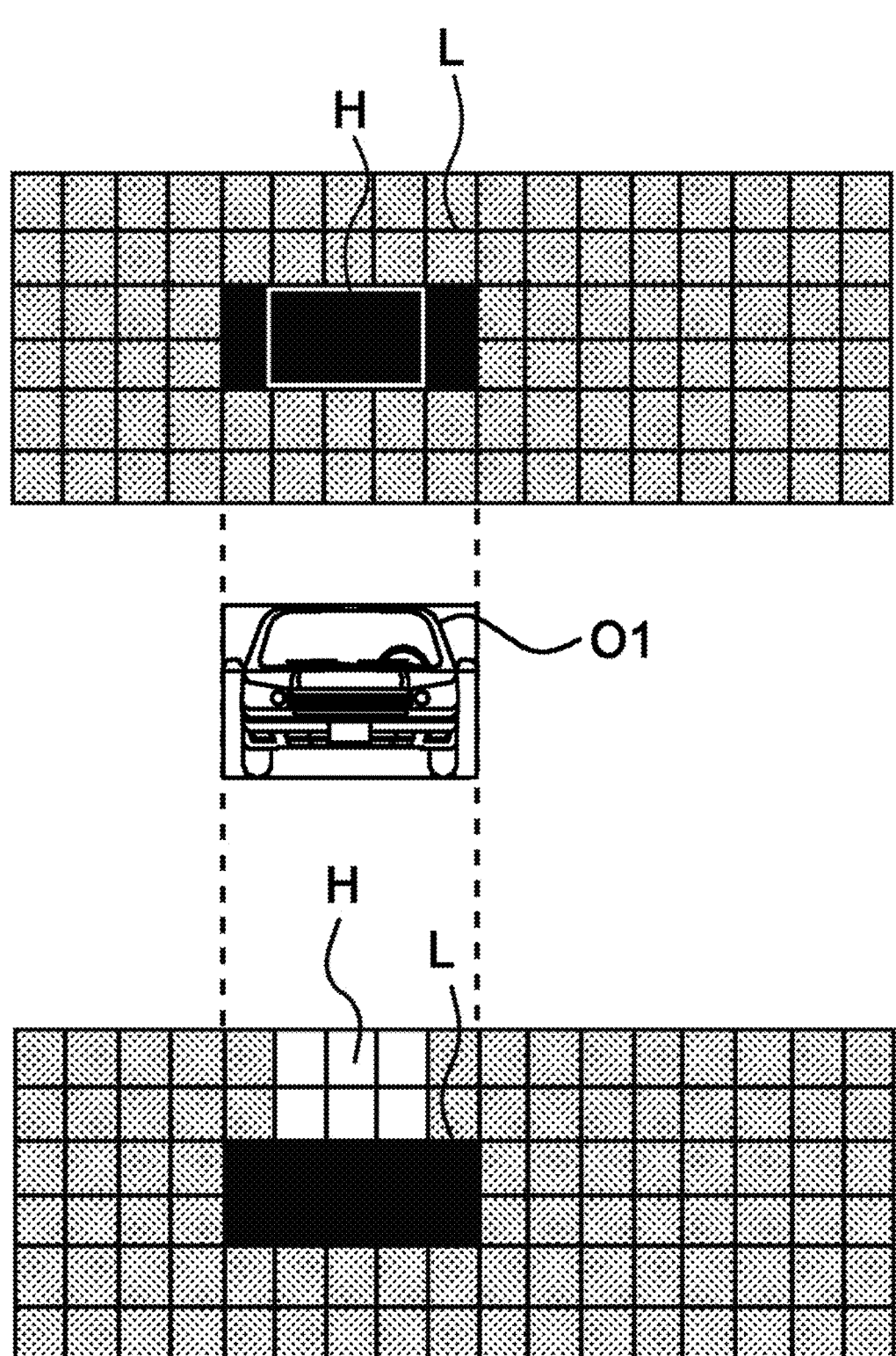
FIG. 7 is a schematic diagram illustrating the second example of the method of correcting the low luminance region and the high luminance region by the control unit according to the present invention, in a case of the second example of the light source unit.

Furthermore, as illustrated in FIGS. 6 and 7, in a case where the second example of the light source unit 100 is applied, and the relative position of the high luminance region H designated according to the steering angle of the steering wheel of the mobility device V and the curvature of the road R at least partially overlaps with the low luminance region L, it is preferable that the control unit 200 adjusts the position of the high luminance region H to the left or right to secure the high luminance region H at the surroundings of the low luminance region L. At this time, it is preferable to irradiate a portion where the low luminance region L and the high luminance region H overlap each other with a designated quantity of light corresponding to the low luminance region L to prevent an external object from being irradiated with light having a high intensity.

More specifically, as illustrated in FIG. 6, in a case where the light source unit 100 is a type of light source unit that emits light in such a way that an entire range corresponding to a width of an obstacle in the vertical direction becomes the low luminance region L, it is preferable that the control unit 200 designates the high luminance region H in such a way that the high luminance region H is moved in the horizontal direction with respect to the low luminance region L to secure the high luminance region H outside the low luminance region L. Alternatively, as illustrated in FIG. 7, in a case where the light source unit 100 is a type of light source unit that also has the vertical control function and thus does not emit only light corresponding to a position of an obstacle, it is preferable that the control unit 200 designates the high luminance region H in such a way that the high luminance region H may be moved not only in the horizontal direction but also the vertical direction with respect to the low luminance region L to secure the high luminance region H outside the low luminance region L. It is preferable that the range of the high luminance region H moved to be positioned outside the low luminance region L has the same size as that of the range of the existing high luminance region H.

At this time, furthermore, when the positions and ranges of the low luminance region L and the high luminance region H are determined by the above-described algorithm, in a case where the low luminance region L and the high luminance region H are adjacent to each other, quantities of light of adjacent pixels may be adjusted to an intermediate value between the quantity of light in the low luminance region L and the quantity of light in the high luminance region H.

Hereinafter, a control method of the front headlamp control system according to the present invention will be described in more detail with reference to FIGS. 8 to 10.

Figure 8:
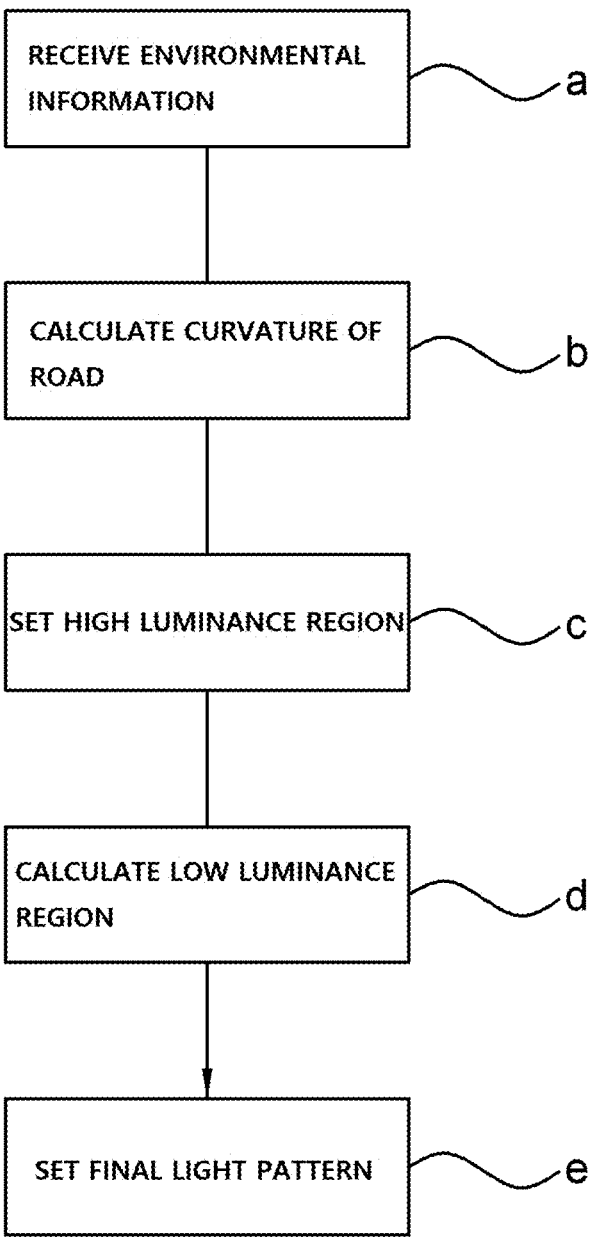
FIG. 8 is a flowchart illustrating a control method of the front headlamp control system according to the present invention.

As illustrated in FIG. 8, the control method of the front headlamp control system according to the present invention may include a step (a) of receiving, by the control unit 200, the environmental information including the steering angle information of the mobility device V and further including at least one of the road surface information of the road surface on which the mobility device V is located or the road R navigation information. Here, the environmental information in the step (a) is preferably received from the sensor unit 300, and the sensor unit 300 preferably includes a navigation system, a camera, and a steering sensor. It is preferable that the control method of the front headlamp control system according to the present invention includes: a step (b) of calculating the curvature of the road R from the received environmental information; and a step (c) of setting or adjusting the high luminance region H based on the environmental information.

Figure 9:
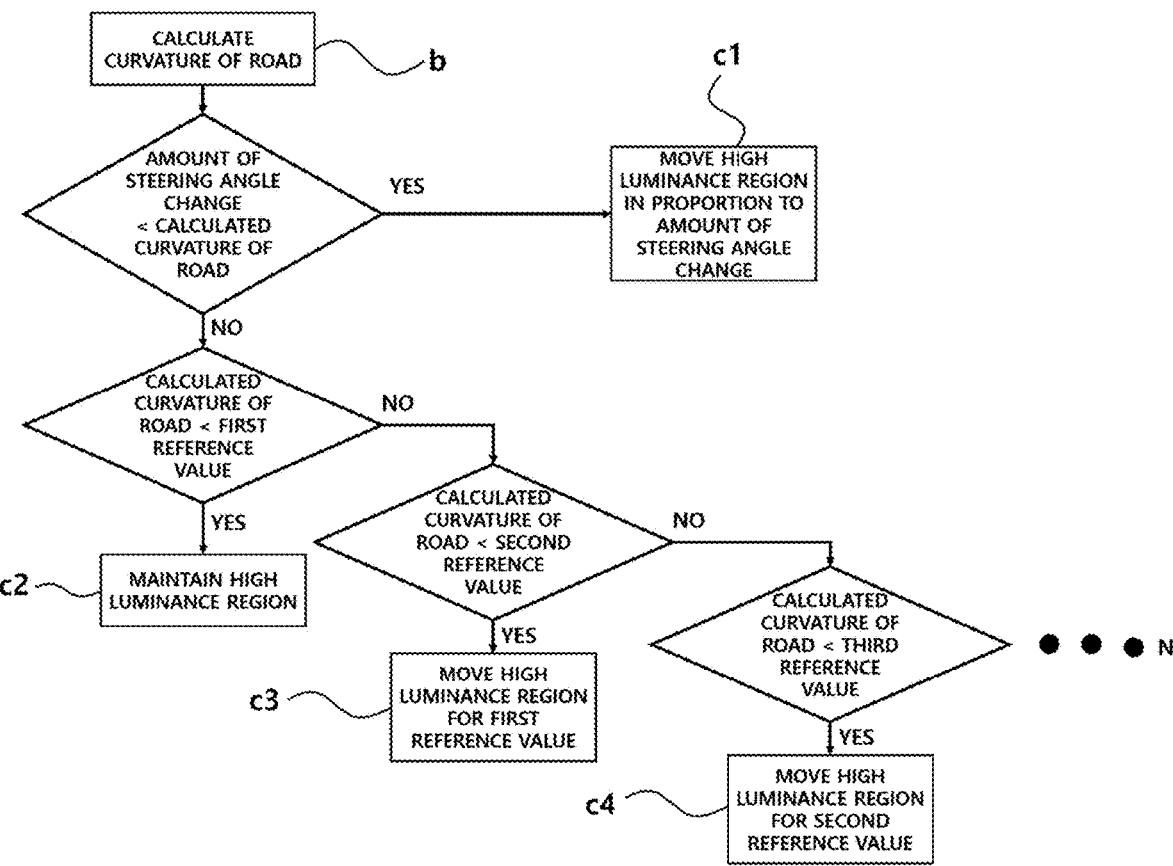
FIG. 9 is a flowchart illustrating detailed steps of a high luminance region setting step according to the present invention.

As illustrated in FIG. 9, it is preferable that the step (c) includes a step (c1) of adjusting, by the control unit 200, the position of the high luminance region H in the steering direction of the mobility device V in such a way that the high luminance region H is moved by a distance proportional to the amount of real-time steering angle change in the steering direction of the mobility device V, in a case where a curvature of an expected route of the mobility device V is greater than the curvature of the road R.

Further, it is preferable that, in the step (c), in a case where a curvature of an expected route of the mobility device V is equal to or less than the curvature of the road R, the control unit 200 sets the first to (n)th reference values for the curvature of the road R (n is a positive integer greater than 1), and the step (c) includes: a step (c2) of maintaining the position of the high luminance region H in a case where the calculated curvature of the road R is less than the first reference value; and a step (c3) of adjusting, by the control unit 200, the position of the high luminance region H in such a way that the position of the high luminance region H is moved by a predetermined distance corresponding to an (i−1)th reference value (i is a positive integer greater than 1 and equal to or smaller than n in a case where the calculated curvature of the road R is less than an (i−1)th reference value.

Figure 10:
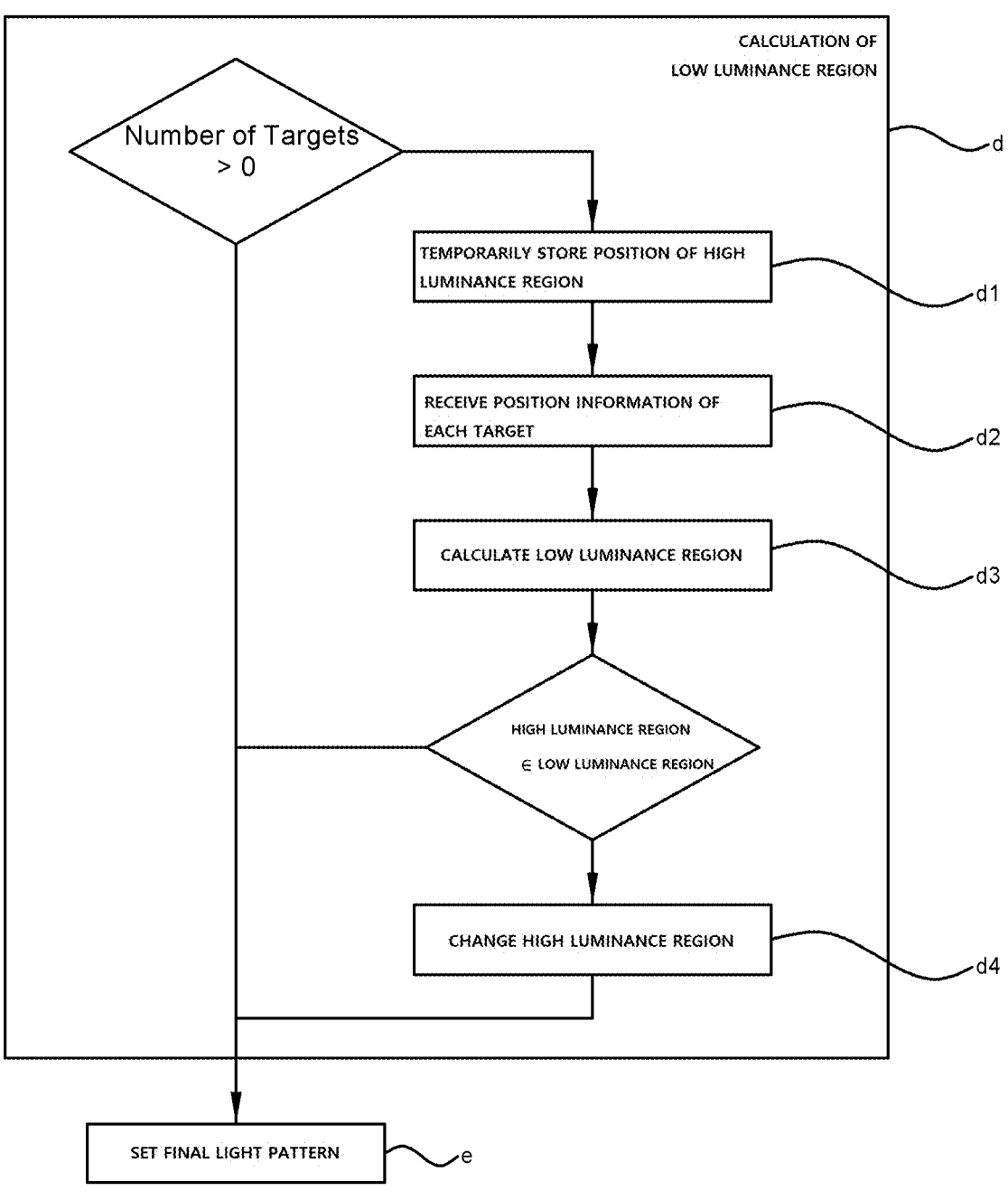
FIG. 10 is a flowchart illustrating detailed steps of a low luminance region calculating step according to the present invention.

In addition, as illustrated in FIG. 10, it is preferable that the environmental information includes information regarding an object in front of the mobility device V, and the control method of the front headlamp control system according to the present invention further includes: after the step (c), in a case where one or more objects exist in front of the mobility device V, a step (d) of calculating, by the control unit 200, a region where the object is positioned in a light irradiation region of the light source unit 100 as the low luminance region L; and a step (c) of setting, by the control unit 200, a final light pattern by adjusting the low luminance region L and the high luminance region H.

It is preferable that the step (d) includes: a step (d1) of temporarily storing the position of the high luminance region H adjusted in the step (c); a step (d2) of receiving and storing position information of the object in front of the mobility device V; and a step (d3) of comparing the position information of the object in front of the mobile vehicle V with the light irradiation region of the light source unit 100 to determine the low luminance region L, and in a case where the high luminance region H and the low luminance region L at least partially overlap each other, the step (d) further includes a step (d4) of expanding the high luminance region H in at least one of the vertical direction or the horizontal direction with respect to the low luminance region L.

More specifically, in the step (d4), in a case where the first example (an example in which a plurality of light emitting elements are independently controlled) of the light source unit 100 is applied, it is preferable that the control unit 200 expands the range of the high luminance region H in the horizontal direction or the vertical direction to secure the high luminance region H. At this time, it is preferable to irradiate a portion where the low luminance region L and the high luminance region H overlap each other with a designated quantity of light corresponding to the low luminance region L to prevent an external object from being irradiated with light having a high intensity. In addition, it is preferable that the size of the high luminance region H expanded to the outside of the low luminance region L is adjusted to be the same as that of the existing high luminance region H.

More specifically, in the step (d4), in a case where the second example (an example in which a swivel actuator is applied to control the light irradiation angle) of the light source unit 100 is applied, it is preferable that the control unit 200 adjusts the position of the high luminance region H to the left or right to secure the high luminance region H. At this time, it is preferable to irradiate a portion where the low luminance region L and the high luminance region H overlap each other with a designated quantity of light corresponding to the low luminance region L to prevent an external object from being irradiated with light having a high intensity. In addition, it is preferable that the size of the high luminance region H expanded to the outside of the low luminance region L is adjusted to be the same as that of the existing high luminance region H.

At this time, furthermore, when the positions and ranges of the low luminance region L and the high luminance region H are determined by the above-described algorithm, in a case where the low luminance region L and the high luminance region H are adjacent to each other, quantities of light of adjacent pixels may be adjusted to an intermediate value between the quantity of light in the low luminance region L and the quantity of light in the high luminance region H.

As described above, the front headlamp control system and the control method thereof according to the present invention are highly applicable to existing vehicles and is capable of efficiently controlling light of a front headlamp by adjusting a light quantity of the front headlamp based on a combination of navigation information and camera information in addition to a steering angle of a steering wheel.

Further, it is possible to increase visibility of an area in front of a driver by calculating a light-off section in a case where there is a preceding vehicle and increasing, in a case where a changed position of a high luminance region overlaps the light-off section, a range of a central luminance region in a horizontal direction or a vertical direction to maintain the high luminance region.

In addition, the front headlamp control system may be easily implemented without an increase in the number of parts and an increase in cost by being controlled by means of interaction with a sensor already mounted in a vehicle.

The present invention should not be construed to being limited to the embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A system for controlling a headlamp of a mobility device, comprising:
   a light source unit disposed at a front of the mobility device and including a plurality of light emitting elements; and
   a control unit configured to:
      receive environmental information of the mobility device, the environmental information including steering angle information of the mobility device and further including at least one of road surface information and road navigation information; and
      control, based on the received environmental information, the light source unit to change a relative position or range of a high luminance region within a predetermined light irradiation region,
   wherein the environmental information further includes object information regarding an object in front of the mobility device,
   wherein, in response to the object information indicating that the object exists in front of the mobility device, the control unit is configured to:

designate, as a low luminance region, a region at which the object is positioned within the light irradiation region, and
      control the light source unit to set a luminance of the low luminance region to be equal to or lower than a first value,
   wherein, in response to the low and high luminance regions at least partially overlapping each other to form an overlapping portion, the control unit is configured to:
      control the light source unit to irradiate the overlapping portion with a light quantity corresponding to the low luminance region, and
      control the light source unit to expand or change the relative position or range of the high luminance region externally of the low luminance region, and
   wherein the control unit controls the light source unit in such a way that the range of the high luminance region adjusted to be positioned outside the low luminance region has the same size as that of the range of the high luminance range before the adjustment.

2. The system of claim 1, wherein the control unit is configured to:
   calculate, based on the steering angle information, an expected movement route of the mobility device;
   calculate, based on at least one of the road surface information and road navigation information, a curvature of a road; and
   in response to a curvature of the expected movement route being greater than the curvature of the road, change a position of the high luminance region in a steering direction of the mobility device based on the steering angle information.

3. The system of claim 1, wherein the control unit is configured to:
   calculate, based on the steering angle information, an expected movement route of the mobility device;
   calculate, based on at least one of the road surface information and road navigation information, a curvature of a road; and
   in response to a curvature of the expected movement route being equal to or less than the curvature of the road, adjust a position of the high luminance region based on the curvature of the road.

4. The system of claim 3, wherein the control unit is configured to:
   sequentially set a plurality of reference values for the calculated curvature of the road;
   compare the plurality of reference values with the calculated curvature of the road; and
   adjust the position of the high luminance region in a plurality of phases.

5. The system of claim 1, wherein, to expand or change the relative position or range of the high luminance region externally of the low luminance region, the control unit is configured to expand or change the relative position or range of the high luminance region in at least one of vertical and horizontal directions with respect to the low luminance region.

6. The system of claim 1, wherein in response to the light source unit being controlled only in a horizontal direction and emitting light in such a way that an entire range corresponding to a width of an obstacle in a vertical direction becomes the low luminance region, the control unit designates the high luminance region in such a way that the high luminance region is moved in the horizontal direction with respect to the low luminance region to position the high luminance region outside the low luminance region.

7. The system of claim 1, wherein in response to the light source unit being controlled in a vertical direction and a horizontal direction and emitting light in such a way that only a range corresponding to a position of an obstacle becomes the low luminance region, the control unit designates the high luminance region in such a way that the high luminance region is moved in the horizontal direction and the vertical direction with respect to the low luminance region outside the low luminance region to position the high luminance region outside the low luminance region.

8. The system of claim 1, wherein in response to the low luminance region and the high luminance region being adjacent to each other, the control unit adjusts quantities of light of adjacent portions to an intermediate value between a quantity of light in the low luminance region and a quantity of light in the high luminance region.

9. A method of operating a front headlamp control system having a light source unit for a mobility device, comprising:

receiving environmental information of the mobility device, the environmental information including steering angle information of the mobility device and further including at least one of road surface information and road navigation information;

calculating, based on the received environmental information, a curvature of a road; and setting or adjusting, based on the received environmental information, a high luminance region, wherein the environmental information includes object information regarding an object in front of the mobility device, wherein the method further comprises, in response to the object information indicating that the object exists in front of the mobility device, performing:

designating, as a low luminance region, a region at which the object is positioned within a light irradiation region of a light source unit; and adjusting the low and high luminance regions to generate a final light pattern, wherein designating, as the low luminance region, the region at which the object is positioned within the light irradiation region of the light source unit includes:

temporarily storing a position of the adjusted high luminance region;

receiving and storing position information of the object; and comparing the position information of the object with the light irradiation region of the light source unit to determine the low luminance region, and wherein, in response to the high and low luminance regions at least partially overlapping each other, expanding the high luminance region in at least one of vertical and horizontal directions with respect to the low luminance region, and wherein in expanding the high luminance region, the control unit controls the light source unit in such a way that a range of the high luminance region adjusted to be positioned outside the low luminance region has the same size as that of the range of the high luminance range before the adjustment.

10. The control method of claim 9, wherein setting or adjusting the high luminance region includes, in response to a curvature of an expected route of the mobility device being greater than the curvature of the road, adjusting a position of the high luminance region by a distance proportional to a steering angle change in a steering direction of the mobility device.

11. The control method of claim 9, wherein setting or adjusting the high luminance region includes:

in response to a curvature of an expected route of the mobility device being equal to or less than the curvature of the road, setting first to (n)th reference values for the curvature of the road, wherein (n) is a positive integer greater than one;

in response to the curvature of the road being less than the first reference value, maintaining a current position of the high luminance region; and in response to the curvature of the road being less than an (i)th reference value, (i) being a positive integer greater than 1 and equal to or smaller than (n), adjusting the position of the high luminance region by a first distance corresponding to an (i−1)th reference value.

12. The control method of claim 9, wherein in expanding the high luminance region, in response to the light source unit being controlled only in the horizontal direction and emitting light in such a way that an entire range corresponding to a width of an obstacle in the vertical direction becomes the low luminance region, the control unit designates the high luminance region in such a way that the high luminance region is moved in the horizontal direction with respect to the low luminance region to position the high luminance region outside the low luminance region.

13. The control method of claim 9, wherein in expanding the high luminance region, in response to the light source unit being controlled in the vertical direction and the horizontal direction and emitting light in such a way that only a range corresponding to a position of an obstacle becomes the low luminance region, the control unit designates the high luminance region in such a way that the high luminance region is moved in the horizontal direction and the vertical direction with respect to the low luminance region outside the low luminance region to position the high luminance region outside the low luminance region.

14. The control method of claim 9, wherein in response to the low luminance region and the high luminance region being adjacent to each other, the control unit adjusts quantities of light of adjacent portions to an intermediate value between a quantity of light in the low luminance region and a quantity of light in the high luminance region.

* * * * *